[19] United States Patent
Tsuzawa et al.

[11] 4,395,810
[45] Aug. 2, 1983

[54] METHOD FOR COATING A SODIUM PIPING IN A FAST BREEDER REACTOR

[75] Inventors: Yasuyuki Tsuzawa, Higashimurayama; Osamu Furukawa, Mito; Keibun Harada, Warabi; Yoichi Uehara, Yokosuka, all of Japan

[73] Assignees: Dohryokuro Kakunenryo Kaihatsujigyodan; Asahi Asbestos Co., Ltd., both of Japan

[21] Appl. No.: 64,385

[22] Filed: Aug. 8, 1979

[51] Int. Cl.³ .............. B21D 39/00; B23P 19/04
[52] U.S. Cl. .................. 29/455 R; 29/463; 138/149; 376/305
[58] Field of Search ........... 29/463, 455 R; 138/149; 176/38, 87

[56] References Cited

U.S. PATENT DOCUMENTS

| | | | |
|---|---|---|---|
| 996,926 | 7/1911 | Harrington | 138/149 X |
| 1,618,455 | 2/1927 | Lindsay | 138/149 X |
| 3,042,080 | 7/1962 | Dosker | 138/149 X |
| 3,151,633 | 10/1964 | Schuman | 138/149 X |
| 3,620,691 | 11/1971 | Rubel | 176/38 X |
| 3,726,642 | 4/1973 | Isaacs et al. | 176/38 X |
| 3,900,366 | 8/1975 | Sakaguchi | 176/38 X |
| 3,924,675 | 12/1975 | Essebaggers | 176/38 X |
| 4,015,636 | 4/1977 | Fossen | 138/149 |
| 4,092,215 | 5/1978 | Mutzi | 176/38 |
| 4,179,071 | 12/1979 | Kozacka | 138/149 X |

FOREIGN PATENT DOCUMENTS

| | | | |
|---|---|---|---|
| 1944763 | 9/1970 | Fed. Rep. of Germany | 138/149 |
| 105697 | 8/1979 | Japan | 176/3 |

Primary Examiner—Charlie T. Moon
Attorney, Agent, or Firm—Price, Heneveld, Huizenga & Cooper

[57] ABSTRACT

A method for covering sodium conveying piping in a fast breeder reactor which makes use of metallic sodium as a coolant material is described herein, which method consists of the steps of preparing a covering material by mixing a raw material having sodium resistance and silicate or phosphate under a wet condition and after press-shaping said mixture drying the shaped mixture, and covering the sodium conveying piping with said covering material, whereby dispersion of leaked metallic sodium from the piping can be prevented.

18 Claims, 20 Drawing Figures

METHOD FOR COATING A SODIUM PIPING IN A FAST BREEDER REACTOR

The present invention relates to a method for covering sodium conveying piping in a fast breeder reactor which makes use of metallic sodium as a coolant material.

Heretofore, as a heat insulator material for coating the outside of the aforementioned sodium conveying piping, asbestos, rock wool, pearlite, calcium silicate, ceramic wool, etc. have been used. As is well known, these heat insulator materials are materials developed as heat insulator materials for use normally in a thermal equipment in a plant system, and they have excellent properties as heat insulator materials. That is, they are materials having thermal resistance and a small thermal conductivity.

However, these heat insulator materials would violently react with metallic sodium, would burn while issuing white smoke and would be destroyed when it makes contact with metallic sodium at a high temperature in the atmosphere. Accordingly, in the case of sheathing sodium conveying piping with these heat insulator materials, if the sodium should leak out of the piping, the leaked sodium would burn while reacting with the heat insulator material, would destroy the heat insulator material and flow out externally, and would result in a very dangerous state where the leaked sodium continues to burn while issuing a large amount of white smoke. Therefore, for example, a method for coating in which the sodium conveying piping is constructed in a double piping structure and the space between the inner and outer pipings is held as an inert gas atmosphere, and a method for coating in which a "trough" or "receiver" is disposed under the piping sheathed with the heat insulator material and even if the sodium should leak and flow out, it is introduced to a "reservoir" where fire is extinguished, have been proposed and investigated. However, these proposed methods cannot be said to be perfect because problems still remain in that the former method is not always advantageous in connection with aspects of construction work as well as economy, and the latter method permits the above-mentioned reaction between the leaked sodium and the heat insulator material, and has the possibility that sodium or its burnt residue compounds may accumulate in the "trough" or "receiver" located under the heat insulator material and thereby prevent the flow of the leaked sodium to the "reservoir".

It is one object of the present invention to provide a method for externally covering sodium conveying piping in a fast breeder rector with a covering material which does not react with metallic sodium at a high temperature nor does it react with sodium that is burning under an oxidation reaction.

Another object of the present invention is to provide a method for externally covering sodium conveying piping in a fast breeder reactor in which leaked metallic sodium can be introduced to a reservoir or the like located at a lower position without being exposed to the atmosphere.

Yet another object of the present invention is to provide a method for externally covering sodium conveying piping in a fast breeder reactor that is free from the disadvantages in the prior art and in which the covering material also serves as a heat insulator.

As is well known, metallic sodium is chemically highly reactive, and in the atmosphere it reacts with oxygen, water and most materials and thus burns. For instance, the above-enumerated heat insulator materials contains $SiO_2$, $CaO$ and $Al_2O_3$ as principal components, and in the atmosphere they violently react with metallic sodium at a high temperature (about 600° C.) and thus burn. Accordingly, the covering material to be used according to the present invention necessarily should have a property of not reacting with metallic sodium at a high temperature, and as one example of such covering materials the following sodium resistive covering material can be used.

That is, the available covering material is a material produced by mixing alkali metal salt or graphite having sodium resistance and silicate or phosphate under a wet condition, press-shaping said mixture and thereafter drying the shaped mixture. If necessary, the mixture could have added to it an inorganic light weight aggregate such as pearlite powder and the like and then press-shaped, and further have added to it metallic soap and then press-shaped, or it could be further modified with the addition of a reinforcement material and then press-shaped, and thereafter the shaped mixture could be dried.

The available alkali metal salt having sodium resistance should withstand metallic sodium at a temperature of about 800° C. at the highest, and for instance, sodium carbonate, sodium bicarbonate, potassium carbonate, etc. are available. As the silicate, sodium silicate and lithium silicate are available, and as the phosphate, sodium phosphate is available and further as inorganic light weight aggregate, pearlite powder, vermicolite powder, pumice powder, volcanic ash, etc. are available. As the reinforcement material, stainless steel fiber yarns or wires, or mineral fiber can be used, and as the metallic soap, stearate can be used.

A representative example of the composition of the above-described coating material is as follows:

| | |
|---|---|
| sodium carbonate anhydride | 50–70 wt % |
| metal stearate | 0.2–5 wt % |
| stainless steel fiber yarns or wires | 0.2–5 wt % |
| sodium silicate | 30–50 wt % |

Also, a representative example of the composition when inorganic light weight aggregate is added to make the coating material light-weighted is as follows:

| | |
|---|---|
| graphite (50–200 mesh) | 20–40 wt % |
| pearlite powder (50–200 mesh) | 40–60 wt % |
| mineral fiber | 1–5 wt % |
| silicate | 10–20 wt % |

Sodium carbonate dehydride forming a principal component absorbs moisture and becomes hydrates of sodium carbonate, which hydrates include $Na_2CO_3.H_2O$, $Na_2CO_3.7H_2O$ and $Na_2CO_3.10H_2O$.

In view of the fact that these hydrates are easily decomposed at a temperature of 100° C. or lower and become sodium carbonate dehydride, hydrate of sodium carbonate could be used in place of the sodium carbonate dehydride above. Also, if graphite is used, molding becomes easy because it does not dissolve in water.

Sodium silicate used as a caking agent is available either in a powder or a liquid state. In the case of using sodium carbonate dehydride, liquid sodium silicate could be used as diluted by water, but in the case of using hydrate of sodium carbonate as described above, preliminarily powder sodium silicate could be mixed and upon shaping an aqueous solution of sodium silicate could be used in addition and then press shaping could be effected.

A stainless steel fiber yarn consists of a bundle of stainless steel fibers (about $12\mu$ in diameter), and it is effective for facilitating press-shaping and mould-removal of a shaped body, increasing mechanical strength of a shaped body, preventing warp of a shaped body and stabilizing dimensions of a shaped body. The stainless steel fiber yarns include the varieties of SUS 304, SUS 310S, SUS 316L, etc. in terms of JIS (Japanese Industrial Standard) for the compositions of stainless steel. Among these varieties, especially SUS 310S has excellent thermal resistance and can withstand a temperature of about 600° C., and this material can be used also in the form of stainless steel wires (about 0.4 mm in diameter). Also, as mineral fibers, asbestos, rock wool, glass fibers and, carbon fibers are available.

Metal stearate which is metallic soap acts as a mould-releasing agent upon removal of a mould, and also it melts at about 100°–200° C. and forms a coating film which is effective for preventing penetration of metallic sodium.

The above-described starting components are mixed together, the mixture is press-shaped under an entirely wet condition and then dried, and thereby a coating material is prepared. Practical examples of the composition are as follows:

EXAMPLE 1

| light-weight sodium carbonate dehydride | 300 parts |
| --- | --- |
| zinc stearate | 6 parts |
| Stainless steel fiber yarns (SUS 310, 3–50 mm in length) | 5 parts |
| sodium silicate No. 3 (15% in concentration) | 200 parts |

Zinc stearate is preliminarily well mixed with light-weight sodium carbonate dehydride, and then sodium silicate of 15% in concentration and stainless steel fiber yarns are added and mixed together. In this case, sodium carbonate dehydride absorbs water in the sodium silicate solution, and if they are mixed for a long time, the sodium carbonate becomes hydrate and loses mouldability. Therefore, mixing is effected within a short period of time, and thereafter the mixture is immediately placed in a mould and press-shaped at a pressure of 30–40 kg/cm². After shaping, the mould is removed, the shaped body is slowly heated, then it is dried by heating at about 105° C. until it becomes dehydride, and thereby a coating material is obtained.

EXAMPLE 2

| light-weight sodium carbonate dehydride | 250 parts |
| --- | --- |
| sodium carbonate hydrate (Na$_2$CO$_3$.10H$_2$O) | 150 parts |
| zinc stearate | 6 parts |
| stainless steel wires (0.4 mm in diameter, 10–50 mm in length) | 5 parts |
| powder sodium silicate No. 3 | 10 parts |
| sodium silicate No. 3 (15% in concentration) | 200 parts |

The method for preparation is almost similar to Example 1 above, in which powder components are preliminarily well mixed, sodium silicate of 15% in concentration and stainless steel wires are added to the above mixture and mixed together, and after the mixture has been press-shaped similarly to Example 1 above, it is dried, and thereby a covering material is obtained.

EXAMPLE 3

| pearlite powder | 30 parts |
| --- | --- |
| graphite | 50 parts |
| mineral fiber | 3 parts |
| sodium silicate (15% in concentration) | 17 parts |

The method for preparation is to mix the solid components excluding sodium silicate under a dry condition and thereafter add sodium silicate. The mixture is then press-moulded at 5 kg/cm² under a half dry (wet) condition thus to obtain the covering material.

It has been confirmed that the covering material for sodium conveying piping obtained in the above-described manner has sodium resistance even upon pouring metallic sodium at about 600° C. onto the surface of the covering material, and it has been also confirmed that penetration of metallic sodium in the direction of thickness of the coating material would not occur. More particularly, the above described covering material according to the present invention has excellent properties in that in the atmosphere the covering material does not react with metallic sodium at a high temperature and also it does not react even with burning sodium under oxidation reaction with the atmosphere, and in addition, the general physical properties of the covering material are as follows:

| Appearance | white or gray, solid state |
| --- | --- |
| Density | 300 kg/m³–1000 kg/m³ |
| Bending strength | 3 kg/cm²–20 kg/cm² |
| Thermal conductivity | 0.05 Kcal/mh °C.–0.2 Kcal/mh °C. |
| Workability | working by means of a saw |

The present invention relates to a method for covering sodium conveying piping characterized in that a covering material which does not react with metallic sodium at a high temperature in the atmosphere as described above is used. Owing to the mounting of such a covering material having sodium resistance on sodium conveying piping, even in the case where metallic sodium at a high temperature should leak out, the situation would be greatly different from the case of employing the conventional heat insulator materials as described above because the metallic sodium at a high temperature would not react with the covering material, and the metallic sodium would not leak out externally of the covering material, that is, to the atmosphere nor would not generate a fire, but if oxygen exists in the gap space between the outer peripheral surface of the sodium conveying piping and the inner peripheral surface of the covering material, then the leaked sodium would burn in that gap space.

This combustion continues until the oxygen in the gap space is consumed, or it continues as long as the leakage of metallic sodium continues, and the burnt out metallic sodium accumulates as sodium oxide. As described above, since leaked sodium does not react with the covering material nor does it penetrate through the covering material, only metallic sodium itself burns on the inner peripheral surface of the covering material in the presence of oxygen, hence apparently no change occurs, and thus there is no fear of causing a fire. In the case where the leaking rate of the leaked sodium is small, it is merely necessary to mount such type of material having sodium resistance on sodium conveying piping, but in the case where metallic sodium leaks at a high pressure or the leaking rate is large, the leaked metallic sodium flows along the inclined wall of the piping because it does not react with the covering material. Accordingly, in the latter case it is desirable to provide a large number of grooves on the inner surface, i.e., the surface of the coating material contacting the sodium conveying piping so that metallic sodium may easily flow to the bottom portion of the piping from whatever position on the sodium conveying piping the metallic sodium may leak out, and to provide a groove serving as a flow path of the leaked sodium on the inner surface of the covering material located at the bottom portion of the piping in the lengthwise direction of the piping. The covering materials are bonded to each other by employing a filler/binder having sodium resistance at the joint portion therebetween (As one example of such a filler/binder, an inorganic sodium-resisting binder having thermal resistance and containing sodium carbonate and sodium silicate as principal components is known). As described above, in the case where a leak rate of metallic sodium is large or it leaks at a high pressure, owing to the provision of the above described grooves on the inner surface of the covering material, if sodium should leak out of the sodium conveying piping, the leaked sodium would at first make contact with this covering material, and since the covering material does not react with it nor does not penetrate it, the leaked sodium flows into the groove for use as a flow path at the bottom portion of the piping, where the leaked sodium burns, if oxygen exists there, and flows along the inclined piping, and the burnt out sodium accumulates in the form of sodium oxide.

Accordingly, by maintaining an inert gas atmosphere in the neighborhood of the groove, the combustion of the leaked sodium can be minimized to hold its fluidity, and thereby the leaked sodium can be introduced safely along the inclined piping into a "reservoir" or the like. However, since it is uneconomical to always maintain an inert gas atmosphere in the neighborhood of the groove, it is desirable to provide an apparatus which can supply an inert gas only when leakage of metallic sodium has occurred by combining with a sodium leak detector.

Moreover, since the temperature of the metallic sodium is about 600° C. as described above, thermal expansion of a piping is large and there is a risk that a gap space may arise at the location of a joint between covering materials. In this case, it may possibly occur that the leaked sodium penetrates the coating material through the gap space, and therefore, it is safer to construct the sodium conveying piping so that two or more layers of covering material are provided with the joints of different layers staggered from each other and bonded by means of a filler/binder having sodium resistance.

In addition, in the case where the covering material having sodium resistance has a high density and high thermal conductivity as described above, since the operating temperature of the sodium conveying piping is about 600° C., in view of the thermal resistance an undesirably thick covering material is necessitated. Therefore, in such a case, the covering material is combined with a heat insulator material, and they are used as a combined material. In this case also, as a matter of course, at first the covering material having sodium resistance is applied to the outer surface of the sodium conveying piping and the above-described inorganic heat insulator material is applied over the outer surface of the covering material. Owing to such a double layer structure, the thickness of the entire covering can be made thin and the covering can be made light in weight. As the outermost layer, in every case, a sheath is applied by making use of a sheathing material that is conventionally used in a heat insulating work.

Now the method for covering a sodium conveying piping in a fast breeder reactor by making use of the above described covering material will be described with reference to the accompanying drawings, wherein:

FIG. 7 is a schematic perspective view showing yet another preferred embodiment of the present invention in which a covering material in the first preferred embodiment in FIG. 1 is formed in double layers and a guide groove is provided on an inner surface of the inner layer of the covering material, FIG. 8 is a cross-section view of the same taken along line VIII—VIII in FIG. 7, FIGS. 9, 11, 13 and 15 are schematic perspective views showing further modified embodiments of the present invention in which a heat insulator material is mounted over the outer surface of the covering material in the preferred embodiments shown in FIGS. 1, 3, 5 and 7, respectively, FIGS. 10, 12, 14 and 16 are cross-section views of the preferred embodiments of the present invention taken along line X—X in FIG. 9, line XII—XII in FIG. 11, line XIV—XIV in FIG. 13 and line XVI—XVI in FIG. 15, respectively.

Figure 1:
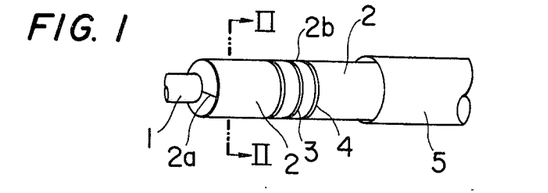
FIG. 1 is a schematic perspective view showing one preferred embodiment of the present invention.
Figure 2:
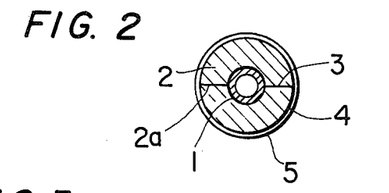
FIG. 2 is a cross-section view of the same taken along line II—II in FIG. 1.

Now the invention will be described in greater detail with reference to the drawings. Referring to FIGS. 1 and 2, reference numeral 1 designates sodium conveying piping, for example, in a fast breeder reactor or the like, and reference numeral 2 designates a covering material having the above-described composition and shaped into longitudinally severed semi-cylindrical pieces. Upon covering the sodium conveying piping 1 with this covering material, the longitudinally severed semi-cylindrical pieces of the coating material 2 are mounted to the sodium conveying piping 1 in an opposed condition to each other, the joints 2a between the pieces of the covering material 2 are bonded by means of a filler/binder 3 having sodium resistance, and the outside of the covering material pieces is tightly bound by means of stainless steel wire 4. This covering material 2 is successively mounted to the sodium conveying piping 1 as continued in its lengthwise direction, and after the joints at the opposite ends of the respective pieces of the covering material 2 have been bonded by means of a filler/binder 3, the outer periphery of the covering material 2 is successively sheathed with a tape form or sheet form of sheathing material 5.

Figure 3:
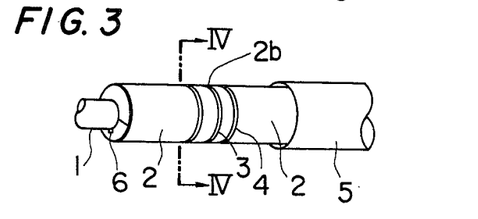
FIG. 3 is a schematic perspective view showing another preferred embodiment of the present invention in which a guide groove is provided on an inner surface of a covering material in the first preferred embodiment shown in FIG. 1.
Figures 4, 5, 6:
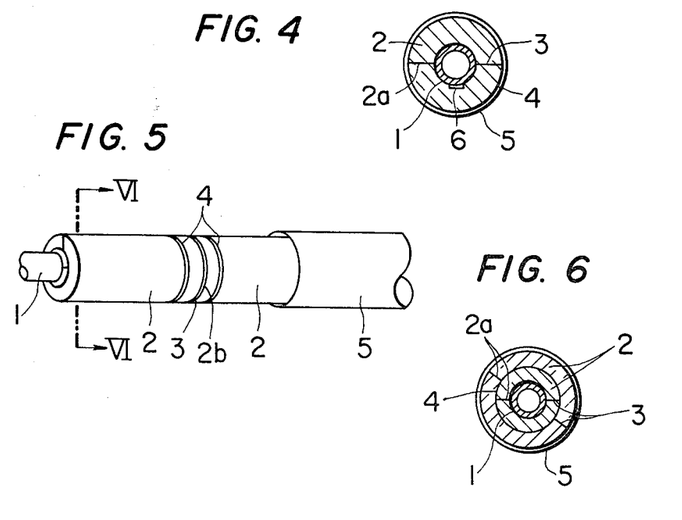
FIG. 4 is a cross-section view of the same taken along line IV—IV in FIG. 3.
FIG. 5 is a schematic perspective view showing still another preferred embodiment of the present invention in which a covering material in the first preferred embodiment in FIG. 1 is formed in double layers.
FIG. 6 is a cross-section view of the same taken alone line VI—VI in FIG. 5.

In a modified embodiment shown in FIGS. 3 and 4, a guide groove 6 for leaked metallic sodium is provided on an inner surface of a covering material 2 at a location where the inner surface of the covering material 2 makes contact with a bottom of a sodium conveying piping 1, and in this case the respective pieces of the covering material 2 are successively mounted so that the guide groove 6 may continuously extend along the bottom of the sodium conveying piping 1. According to this preferred embodiment of the invention, in the case where metallic sodium should leak out of the sodium conveying piping 1, the leaked sodium could be safely introduced to a "reservoir" (not shown) provided at a lower position while flowing along the guide groove 6.

In a further modified embodiment shown in FIGS. 5 and 6, the longitudinally severed semi-cylindrical pieces of covering material 2 are mounted in double layers, preferably with the joints 2a between outside semi-cylindrical pieces of the covering material 2 angularly staggered from the joints 2a between inside semi-cylindrical pieces of the covering material 2 and with the joints 2b at the opposite ends of the outside covering material 2 axially staggered from the joints 2b at the opposite ends of the inside covering material 2. Owing to such staggered positioning of the joints of the inside and outside covering materials 2, leakage of metallic sodium through the joints 2a, 2b between the inside semi-cylindrical pieces of covering material 2 can be more positively prevented.

Figures 7, 8, 9, 10, 11, 12:
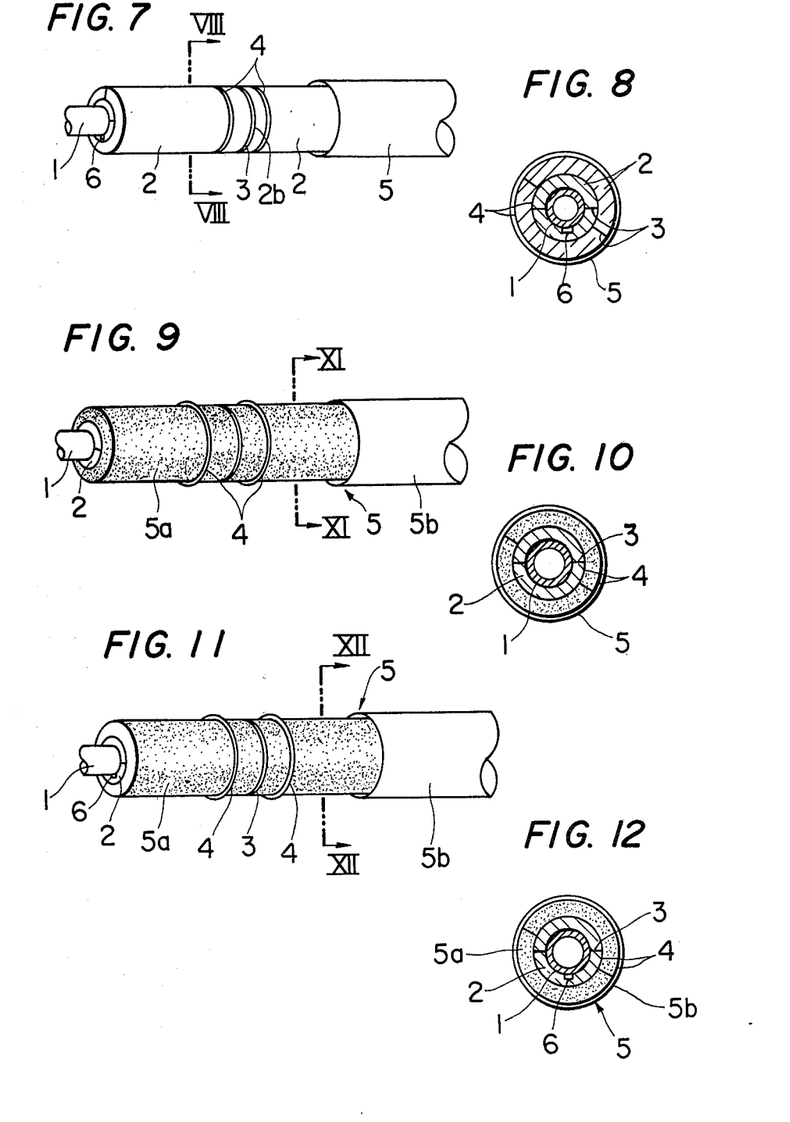
Figure 13:
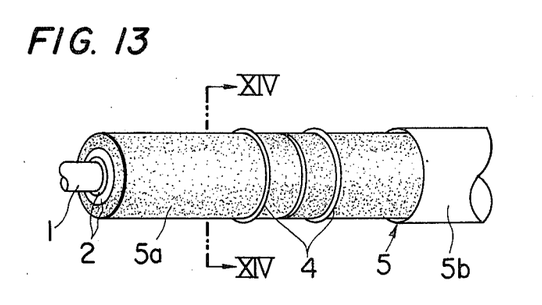
Figure 14:
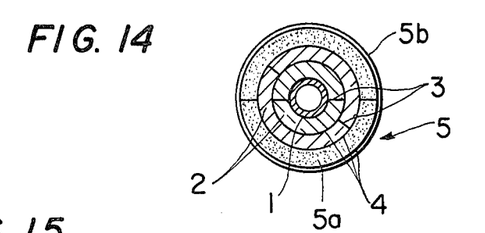
Figure 15:
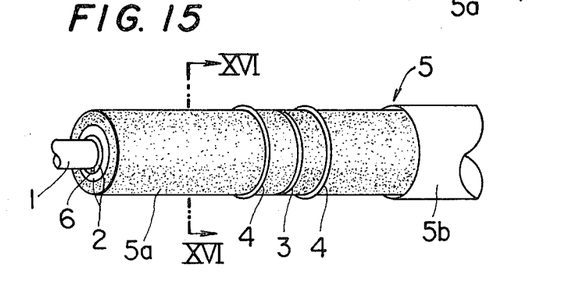
Figure 16:
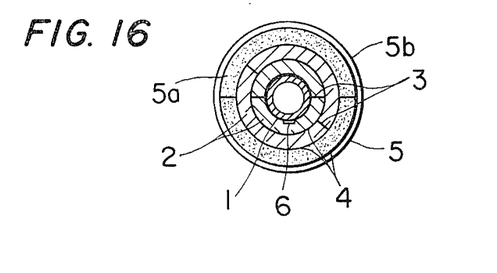

In another modified embodiment shown in FIGS. 7 and 8, the covering material 2 is applied to the sodium conveying piping 1 in double layers, and also similarly to the embodiment shown in FIGS. 3 and 4 a guide groove 6 is provided on the inner surface of the covering material 2 at a location where the inner surface makes contact with the bottom of the sodium conveying piping 1.

In the preferred embodiments illustrated in FIGS. 1 to 8, the sheathing material 5 used therein is a sheathing material similar to that used in the conventional heat insulating work. However, as shown in FIGS. 9 to 16, if an inorganic heat insulator material 5a and a tape form or sheet form of sheathing material 5b are used in combination as a composite sheathing material 5, and if the heat insulator material 5a is first mounted on the outer surface of the covering material and thereafter the outer surface of the heat insulator material 5a is sheathed with the tape form or sheet form of sheathing material 5b, then the heat insulating effect can be enhanced.

Figure 17:
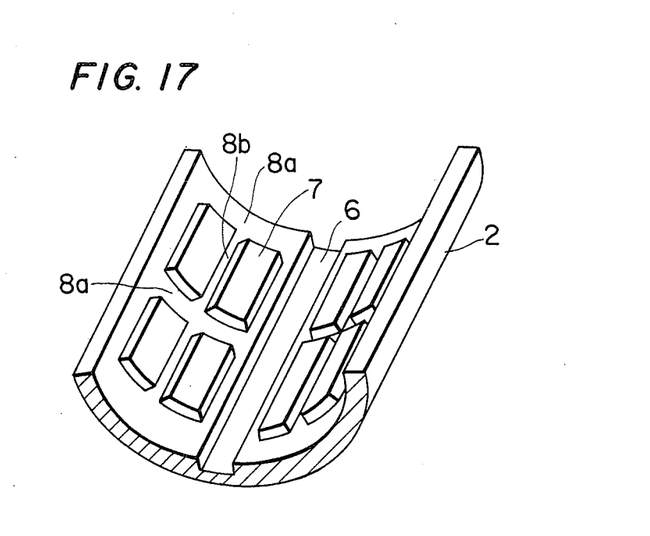
FIG. 17 is a perspective view showing an inner surface configuration of a covering material.

With reference to FIG. 17 which illustrates details of an inner surface configuration of a semi-cylindrical piece of coating material 2, a plurality of protrusions 7 are formed on the inner surface of the longitudinally severed semi-cylindrical piece of covering material 2, and by means of these protrusions 7 circumferential grooves 8a and longitudinal grooves 8b are formed on the inner surface of the covering material 2, so that leaked metallic sodium may flow along these grooves to be concentrated into a guide groove 6 for metallic sodium provided at the bottom of the inner surface.

Figure 18:
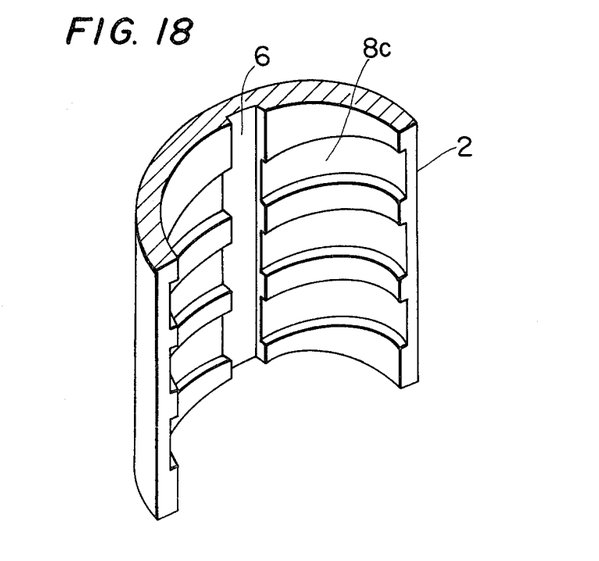
FIG. 18 is a perspective view showing a different inner surface configuration of a covering material.

FIG. 18 illustrates details of an inner surface configuration of a longitudinally severed semi-cylindrical piece of covering material 2 that is to be mounted onto an upright portion of a sodium conveying piping, in which inclined grooves 8c are formed on the inner surface of the semi-cylindrical piece so that leaked metallic sodium may flow along the inclined grooves 8c to be concentrated into a guide groove 6.

It is to be noted that the semi-cylindrical pieces of covering material illustrated in FIGS. 17 and 18 are mounted onto sodium conveying piping 1 in the same manner as the preferred embodiments illustrated in FIGS. 1 through 16.

Figure 19:
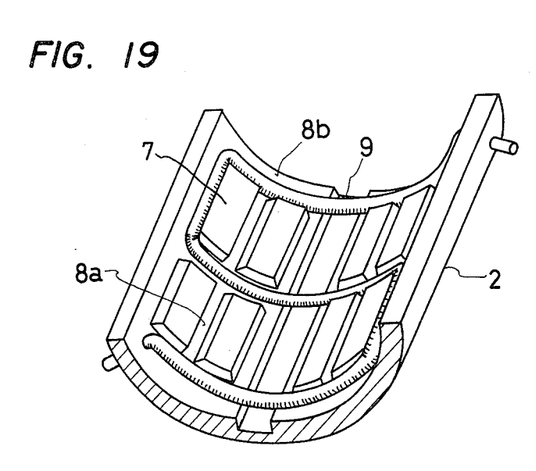
FIG. 19 is a perspective view of the covering material shown in FIG. 11 having a sheath heater mounted thereto.

In a further modification of semi-cylindrical piece of covering material illustrated in FIG, 19, there is provided a sheath heater 9 for maintaining a temperature of metallic sodium by making use of the grooves 8a and 8b on the inner surface of the covering material 2 shown in FIG. 17 for accommodating the sheath heater 9 therein.

Figure 20:
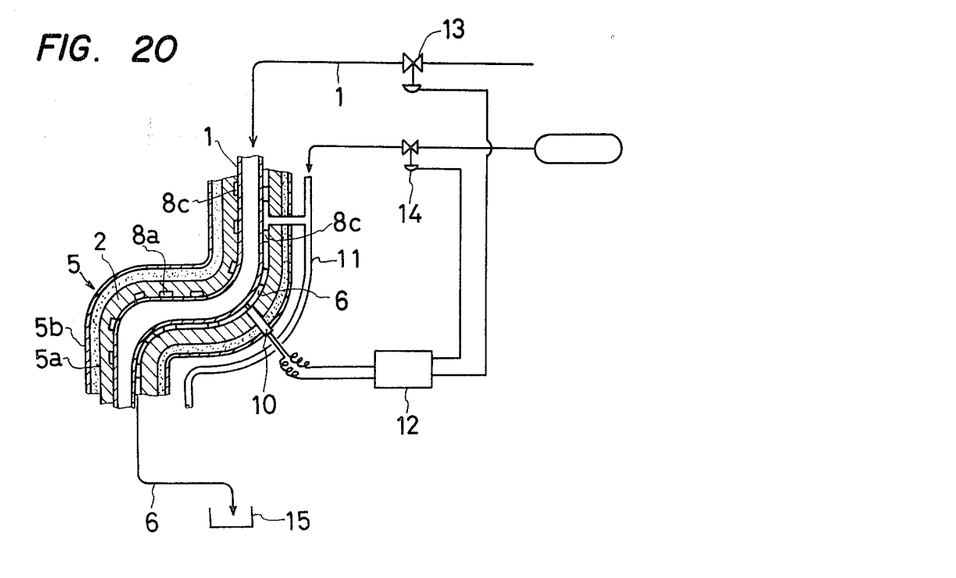
FIG. 20 shows one example of a complete sodium conveying piping system in which a covering material is applied to sodium conveying piping and further a sodium detector and an innert gas supply piping are associated thereto.

In a complete sodium conveying piping system illustrated in FIG. 20, after a sodium piping 1 has been covered with the conveying material 2 according to the above-described embodiments of the present invention, a leak detector 10 for metallic sodium is provided within the guide groove 6 for metallic sodium on the inner surface of the covering material 2 and also an innert gas supply piping 11 is connected to the guide groove 6. Upon operation, leakage of metallic sodium can be detected by the leak detector 10, a control device 12 responds to an output signal from the leak detector 10 for closing a valve 13 located on the upstream side of the sodium conveying piping 1 to prevent metallic sodium from leaking over a long period, and for simultaneously opening a supply valve 14 for an inert gas to supply the inert gas into the guide groove 6. Consequently, the leaked metallic sodium can be safely introduced into a reservoir 15 located at a lower position while flowing along the guide groove 6.

Although the covering material was shaped into longitudinally severed semi-cylindrical pieces in the above-described embodiments, as a matter of course the present invention should not be limited to this particular shape of covering material pieces. The sodium conveying piping can be covered with covering material pieces having a shape of 3-severed or 4-severed cylinders depending upon the diameter of the sodium conveying piping.

As described above, according to the present invention, since a covering material having sodium resistance is applied to a sodium conveying piping, even if metallic sodium at a high temperature should leak out of the sodium conveying piping, as distinguished from the heretofore known sodium conveying piping system in which the conventional heat insulating material is used, the leaked sodium would not react with the covering material nor would it penetrate through the covering material. Therefore, the method for covering according to the present invention is essentially necessary for covering a sodium conveying piping without the risk of generating a fire or exposing leaked sodium to the atmosphere.

Since many changes could be made in the above construction and apparently widely different embodiments of the present invention could be practiced by those skilled in the art, it is intended that all matter contained in the above description or shown in the accompanying drawings shall be interpreted as illustrative and not as limitation to the scope of the invention.

What is claimed is:

1. A method for externally covering sodium conveying piping, comprising preparing covering material by adding a caking agent having sodium resistance to a raw material having sodium resistance and press-shaping the mixture, applying said covering to the sodium conveying piping, and then a sheathing material is sheathed over the outer surface of the covering material.

2. A method for externally covering sodium conveying piping as claimed in claim 1, in which said covering material is preliminarily shaped into a plurality of longitudinally severed cylinder pieces, and said longitudinally severed cylinder pieces of covering material are mounted onto the sodium conveying piping successively in the circumferential direction to cover the sodium conveying piping.

3. A method for externally covering sodium conveying piping as claimed in claim 2, in which joints between the longitudinally severed cylinder pieces of covering material mounted onto the sodium conveying piping successively in the circumferential direction are bonded by means of a filler/binder having sodium resistance, then the outer surface of the covering material is tightly bound by means of a stainless steel wire, and thereby the sodium conveying piping is covered with said covering material.

4. A method for externally covering sodium conveying piping as claimed in claim 1, in which said covering material is shaped into a plurality of longitudinally severed cylinder pieces so that said covering material consists of a plurality of layers in the radial direction of the sodium conveying piping and each said layer consists of a plurality of sectors in the circumferential direction, and after the covering material pieces of the inside layer have been mounted onto the sodium conveying piping successively in the circumferential direction, the covering material pieces of the outside layer are mounted over the outer surface of the inside covering layer successively in the circumferential direction, and thereby the sodium conveying piping can be covered with a plurality of layers of covering material.

5. A method for externally covering sodium conveying piping as claimed in claim 2, in which a guide groove for metallic sodium is provided in the axial direction on the inner surface of the covering material at the location where said inner surface makes contact with the bottom of said sodium conveying piping.

6. A method for externally covering sodium conveying piping as claimed in claim 2, in which a guide groove for metallic sodium is provided in the axial direction on the inner surface of the covering material at the location where said inner surface makes contact with the bottom of said sodium conveying piping, and also additional guide grooves for introducing leaked metallic sodium to said first guide groove are provided on the inner surface of the covering material.

7. A method for externally covering sodium conveying piping in a fast breeder reactor, comprising preparing a covering material by mixing alkali metal salt having sodium resistance and silicate or phosphate under a wet condition, press-shaping said mixture and thereafter drying the shaped mixture, covering the sodium conveying piping with the dried shaped mixture, and then sheathing the outer surface of the covering material with a sheathing material.

8. A method for externally covering sodium conveying piping in a fast breeder reactor as claimed in claim 7, in which said covering material comprises 50 to 70 percent by weight of sodium carbonate and 30 to 50 percent by weight of silicate.

9. A method for externally covering sodium conveying piping in a fast breeder reactor as claimed in claim 7, in which said covering material is preliminarily shaped into a plurality of longitudinally severed pieces collectively of a cylindrical shape, and mounting said longitudinally severed cylinder pieces of covering material onto the sodium conveying piping successively in the circumferential direction to cover the sodium conveying pipings.

10. A method for externally covering sodium conveying piping in a fast breeder reactor as claimed in claim 9, in which joints between the longitudinally severed pieces collectively of cylindrical shape of covering material mounted on the sodium conveying piping successively in the circumferential direction are bonded by means of a filler/binder having sodium resistance, then the outer surface of the covering material is tightly bound by means of a stainless steel wire whereby the sodium conveying piping is covered with said covering material.

11. A method for externally covering sodium conveying piping in a fast breeder reactor as claimed in claim 7, in which said covering material is shaped into a plurality of longitudially severed pieces collectively of cylindrical shape so that said covering material consists of a plurality of layers in the radial direction of the sodium conveying piping and each said layer consists of a plurality of sectors in the circumferential direction, and after the covering material pieces of the inside layer have been mounted on the sodium conveying piping successively in the circumferential direction, covering material pieces of an outside layer are mounted over the outer surface of the inside covering layer successively in the circumferential direction whereby the sodium conveying piping is coated with a plurality of layers of covering material.

12. A method for externally covering sodium conveying piping in a fast breeder reactor as claimed in claim 9, in which a guide groove for metallic sodium is provided in the axial direction on the inner surface of the covering material at the location where said inner surface makes contact with the bottom of said sodium conveying piping.

13. A method for externally covering sodium conveying piping in a fast breeder reactor as claimed in claim 9, in which a guide groove for metallic sodium is provided in the axial direction on the inner surface of the covering material at the location where said inner surface makes contact with the bottom of said sodium conveying piping, and also additional guide grooves for introducing leaked metallic sodium to said first guide groove are provided on the inner surface of the covering material.

14. A method for externally covering sodium conveying piping, comprising preparing a covering material by adding a caking agent having sodium resistance to a raw material having sodium resistance, press-shaping the mixture and forming a guide groove for metallic sodium on its inner surface, covering the sodium piping with said shaped and grooved covering material, then sheathing a sheathing material over the outer surface of the covering material, disposing a metallic sodium detector in the guide groove formed on the inner surface of said covering material, connecting an inert gas supply pipe to said guide groove, and coupling said detector and said inert gas supply pipe to a control device.

15. A method for externally covering sodium conveying piping as claimed in claim 14, in which said covering material covering said sodium conveying piping is preliminarily shaped into a plurality of longitudinally severed pieces collectively of cylindrical shape and said guide groove formed on the inner surface of the covering material is positioned at the bottom of said sodium conveying piping.

16. A method for externally covering sodium conveying piping as claimed in claim 15, in which said covering material is prepared by mixing an alkali metal salt having sodium resistance and silicate or phosphate under a wet condition, press-shaping said mixture, and thereafter drying the shaped mixture.

17. A method for externally covering sodium conveying piping in a fast breeder reactor, comprising preparing covering material by mixing a raw material having sodium resistance, inorganic light weight aggregate and an inorganic caking agent under a wet condition, press-shaping said mixture and thereafter drying the shaped mixture, applying said covering to sodium conveying piping, and then sheathing a sheathing material over the outer surface of the covering material.

18. A method for externally covering sodium conveying piping in a fast breeder reactor as claimed in claim 17, in which said covering material comprising 20 to 40 percent by weight of graphite is used as said raw material having sodium resistance, 40 to 60 percent by weight of pearlite powder is used as said inorganic light weight aggregate, and 10 to 20 percent by weight of silicate is used as said inorganic caking agent.

* * * * *

UNITED STATES PATENT AND TRADEMARK OFFICE
CERTIFICATE OF CORRECTION

PATENT NO. : 4 395 810

DATED : August 2, 1983

INVENTOR(S) : Yasuyuki Tsuzawa et al.

It is certified that error appears in the above-identified patent and that said Letters Patent is hereby corrected as shown below:

Column 5, line 12:

Before "material" insert --covering--

Column 5, line 41:

"does not penetrate" should be --does the sodium penetrate--

Column 8, line 10:

"coating" should be --covering--

Column 8, line 40:

"conveying" should be --covering--

Signed and Sealed this

First Day of May 1984

[SEAL]

Attest:

GERALD J. MOSSINGHOFF

Attesting Officer     Commissioner of Patents and Trademarks